(12) United States Patent
Hartleip et al.

(10) Patent No.: US 7,395,732 B2
(45) Date of Patent: Jul. 8, 2008

(54) SHIFTER ROD ASSEMBLIES FOR AUTOMOTIVE TRANSMISSIONS

(75) Inventors: Larry G. Hartleip, Brighton, MI (US); Michael C. Wissinger, Flushing, MI (US)

(73) Assignee: General Motors Corporation, Detroit, MI (US)

( * ) Notice: Subject to any disclaimer, the term of this patent is extended or adjusted under 35 U.S.C. 154(b) by 708 days.

(21) Appl. No.: 10/922,768

(22) Filed: Aug. 20, 2004

(65) Prior Publication Data

US 2006/0037423 A1   Feb. 23, 2006

(51) Int. Cl.
*B60K 20/00* (2006.01)
(52) U.S. Cl. ............... 74/473.29; 464/131; 464/11; 464/136
(58) Field of Classification Search ........... 464/131, 464/11, 136; 74/473.1, 473.29
See application file for complete search history.

(56) References Cited

U.S. PATENT DOCUMENTS

| 3,817,057 | A | * | 6/1974 | Orain ................... 464/89 |
| 5,312,300 | A | * | 5/1994 | McGregor et al. ......... 464/175 |
| 6,183,369 | B1 | * | 2/2001 | Faulbecker et al. ......... 464/131 |

* cited by examiner

*Primary Examiner*—David M Fenstermacher

(57) ABSTRACT

A shifter rod assembly used in automotive vehicles extends between a manual shifter assembly having a manual shift lever and a transmission spaced from the manual shift lever. Large tolerance universal joints with play between the components thereof connect the shifter rod assembly to the manual shifter assembly and to the transmission. In order to eliminate rattle noise in the universal joints, the universal joints are each encased in a layer of elastomer. A preferred elastomer is silicone elastomer can be applied in liquid form, cures at room temperature and maintains integrity at temperatures in a range of about 200° F. to 240° F.

13 Claims, 4 Drawing Sheets

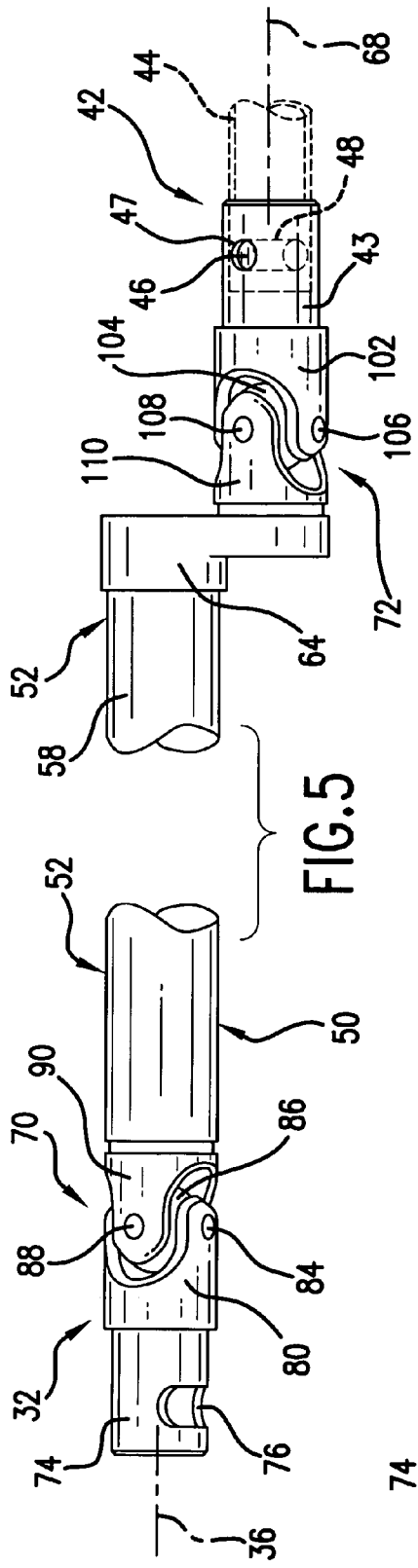
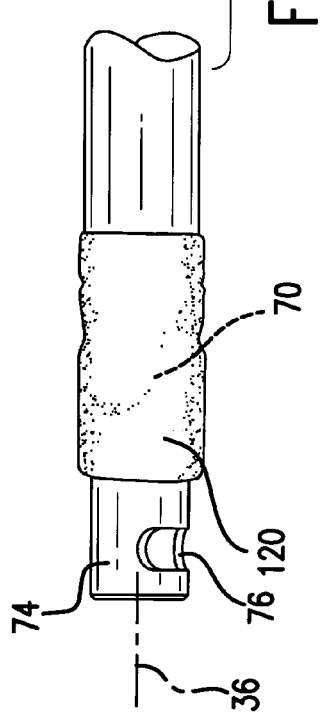
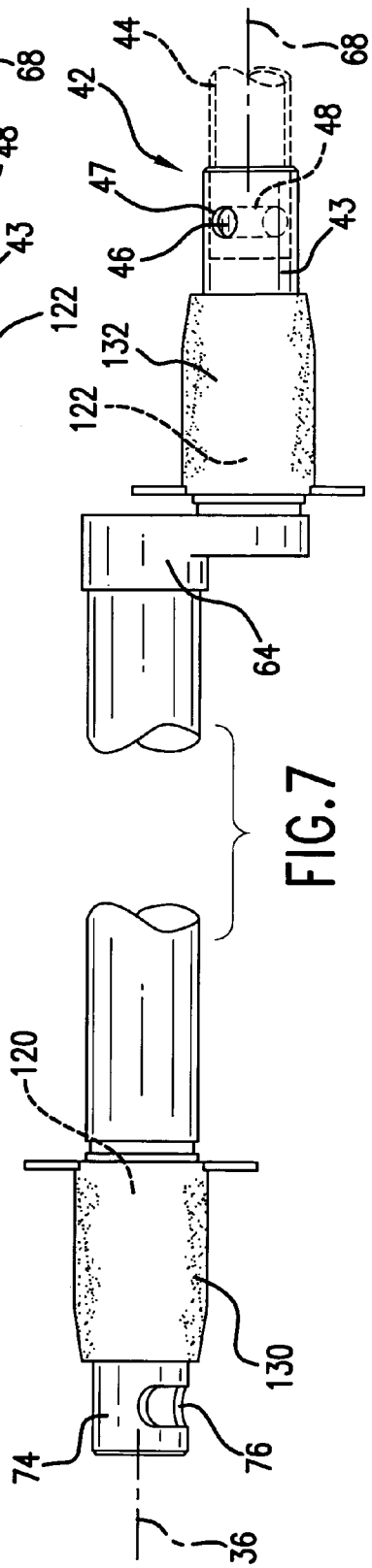

SHIFTER ROD ASSEMBLIES FOR AUTOMOTIVE TRANSMISSIONS

FIELD OF THE INVENTION

This invention relates to shifter rod assemblies for automotive transmissions. More particularly, this invention relates to shifter rod assemblies which extend from gear shift levers to transmissions for manually changing output speeds and rotational directions of transmissions.

BACKGROUND OF THE INVENTION

Typically, automotive vehicles include a powertrain comprising an engine which is coupled by a clutch to a transmission that is in turn connected to road wheels. To select gear ratios, the gears of manual transmissions are axially shifted and rotated by a lever in the passenger compartment. When the transmission is not positioned adjacent to the person driving the vehicle, it is necessary to connect the shift lever to the transmission with a linkage. In some automotive vehicles, the transmission is positioned proximate the rear road wheels, while the engine is disposed adjacent to the front road wheels. Since in this arrangement the transmission is behind the driver, there is a need for a shifter rod assembly which transmits shift lever positions back to the transmission. This involves axial pushing, pulling, and rotation of the shifter rod assembly. Moreover, an actuator shaft extending transversely from the shift lever is not aligned with the far end of shifter rod assembly. Consequently, the shifter rod assembly has parts which move relative to one another during shifting to accommodate axial misalignment. In accordance with one arrangement, this misalignment is accommodated by universal joints positioned at opposite ends of the shifter rod assembly.

When an automotive component such as a universal joint is assembled with parts which move relative to one another, the cost of the assembly becomes a consideration because there is a tendency to decrease tolerances in order to minimize vibration. Decreasing tolerances requires increasing machining expenses. Consequently, there is a need to minimize vibration of shifter rod assemblies having universal joints without substantially increasing cost.

SUMMARY OF THE INVENTION

In view of the aforementioned considerations, a shifter rod assembly is provided having a first end for connection to a manual gear shift and a second end for connection to a transmission for transmitting both axial and rotational motion from the manual gear shift to the transmission. The first end of the shifter rod is connected to the gear shift assembly through a first universal joint and the second end of the shifter rod is connected to the transmission through a second universal joint. Elastomer encases the first universal and second universal joints.

In a further aspect of the shifter rod assembly, first and second boots are disposed over the elastomer.

In still a further aspect of the shifter rod assembly, the first and second universal joints are low precision, large tolerance universal joints having components with play therein permitting noise to emanate from the universal joints in the absence of elastomer encasing the universal joints.

In still a further aspect of the shifter rod assembly, the elastomer is comprised of a silicone elastomer compound that cures at room temperature.

BRIEF DESCRIPTION OF THE DRAWINGS

Various other features and attendant advantages of the shifter rod assembly will be more fully appreciated as the same becomes better understood when considered in conjunction with the accompanying drawings, in which like reference characters designate the same or similar parts throughout the several views, and wherein:

FIG. 5 is a side perspective view of the shifter rod assembly of FIG. 4 with uncovered universal joints;

FIG. 6 is a side perspective view of a shifter rod assembly similar to FIG. 5 but showing universal joints encased in elastomer, and FIG. 7 is a view similar to FIGS. 5 and 6 showing rubber boots positioned over the elastomer of FIG. 6.

DETAILED DESCRIPTION

Figure 1:
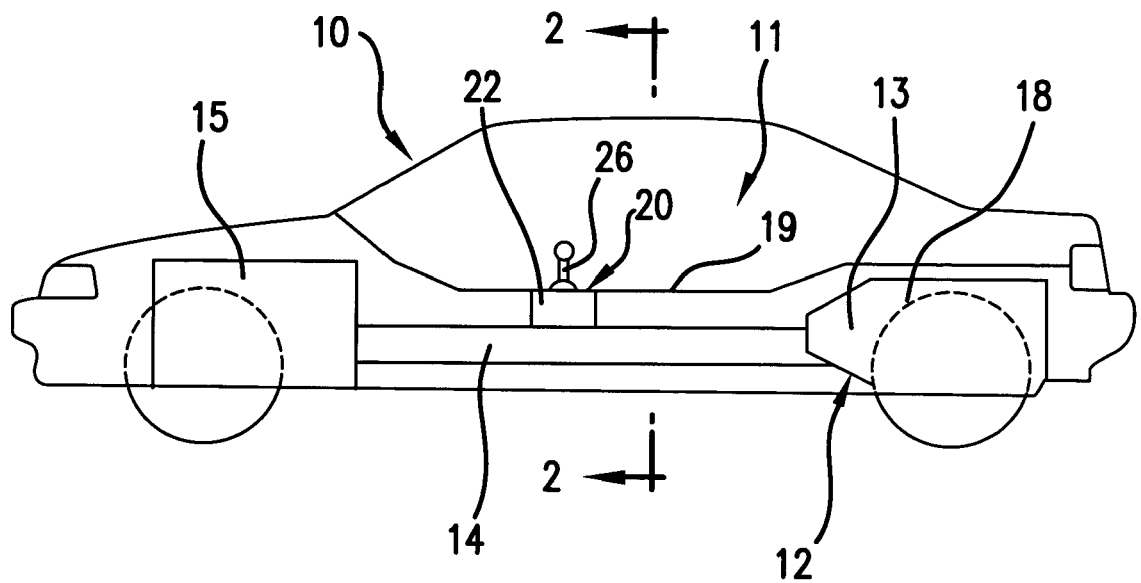
FIG. 1 is a schematic side view of an automotive vehicle employing the shifter rod assembly of the present invention.
Figure 2:
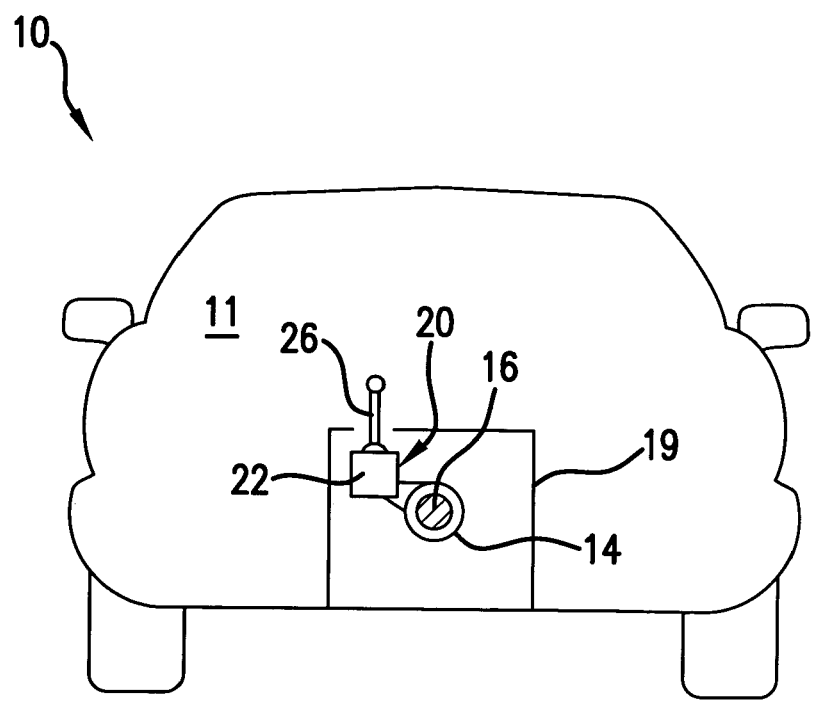
FIG. 2 is an elevation taken along lines 2-2 of FIG. 1.

Referring now to FIGS. 1-2 there is shown an automotive vehicle 10 having a passenger compartment 11 behind which is positioned a rear transaxle 12 for driving rear road wheels of the vehicle. The transaxle 12 has a bell housing 13 connected by a torque tube 14 to an engine 15. A propeller shaft 16 that rotates within the torque tube 14 drives a manual transmission 18 which is part of the transaxle 12.

The torque tube 14 is isolated from the passenger compartment 11 of the vehicle 10 by a tunnel 19 in which a manual shifter assembly 20 having a housing 22 is disposed. The housing 22 is bolted by bolts 24 to the exterior of the torque tube 14. Projecting from the housing 22 and upward out of the tunnel 19 is a manual shift lever 26 that is operated by a driver in the passenger compartment 11 of the vehicle 10.

Figure 3:
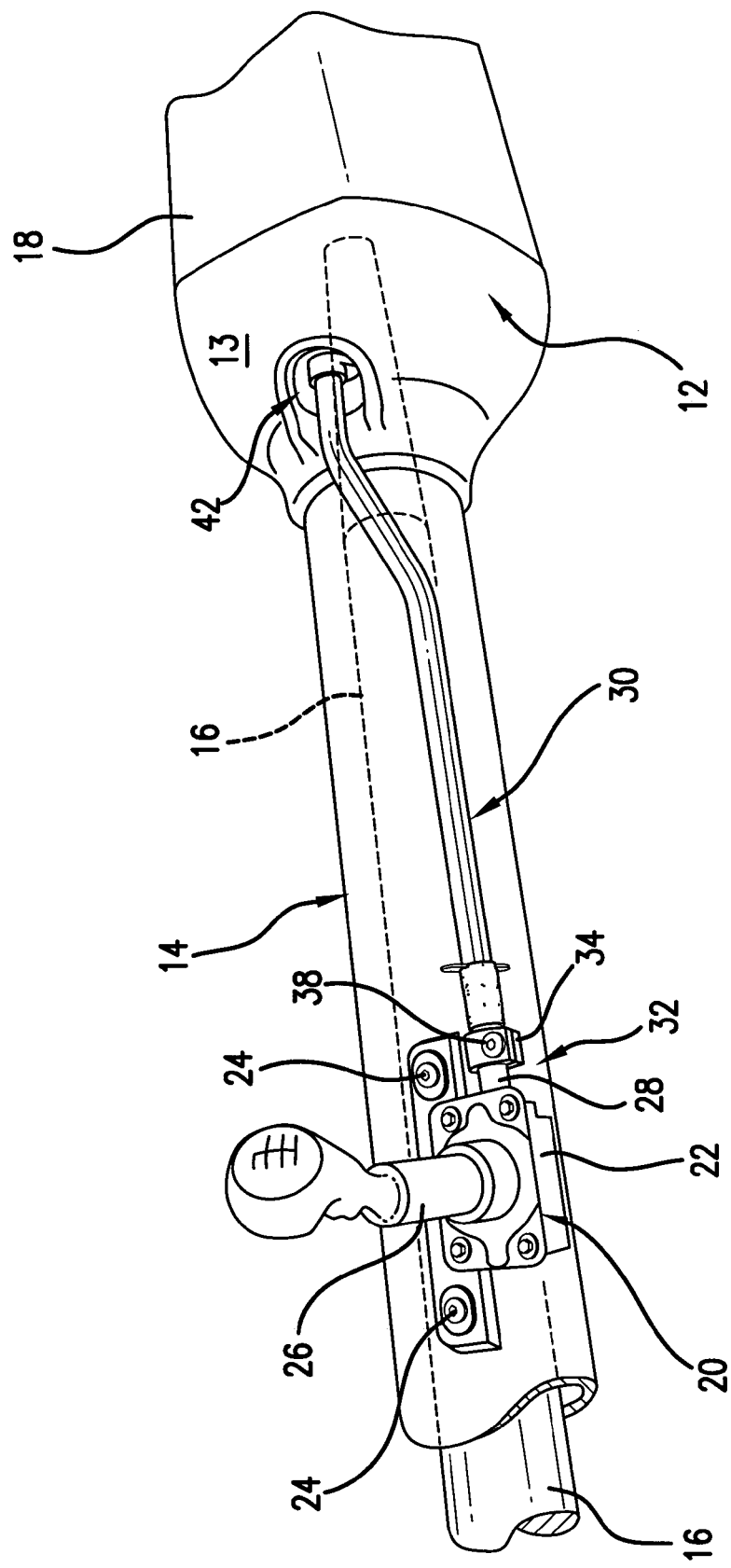
FIG. 3 is a perspective view of a shifter rod assembly extending between a manual gear shift assembly and a transmission.

Referring now mainly to FIG. 3, within the housing 20 the manual shift lever 26 is connected by an actuator shaft 28 to a shifter rod assembly 30 that extends to the transmission 18 within the transaxle 12. In accordance with one example in which the transaxle is behind the driver, the shifter rod assembly 30 has a length of about 0.6 meters.

Figure 4:
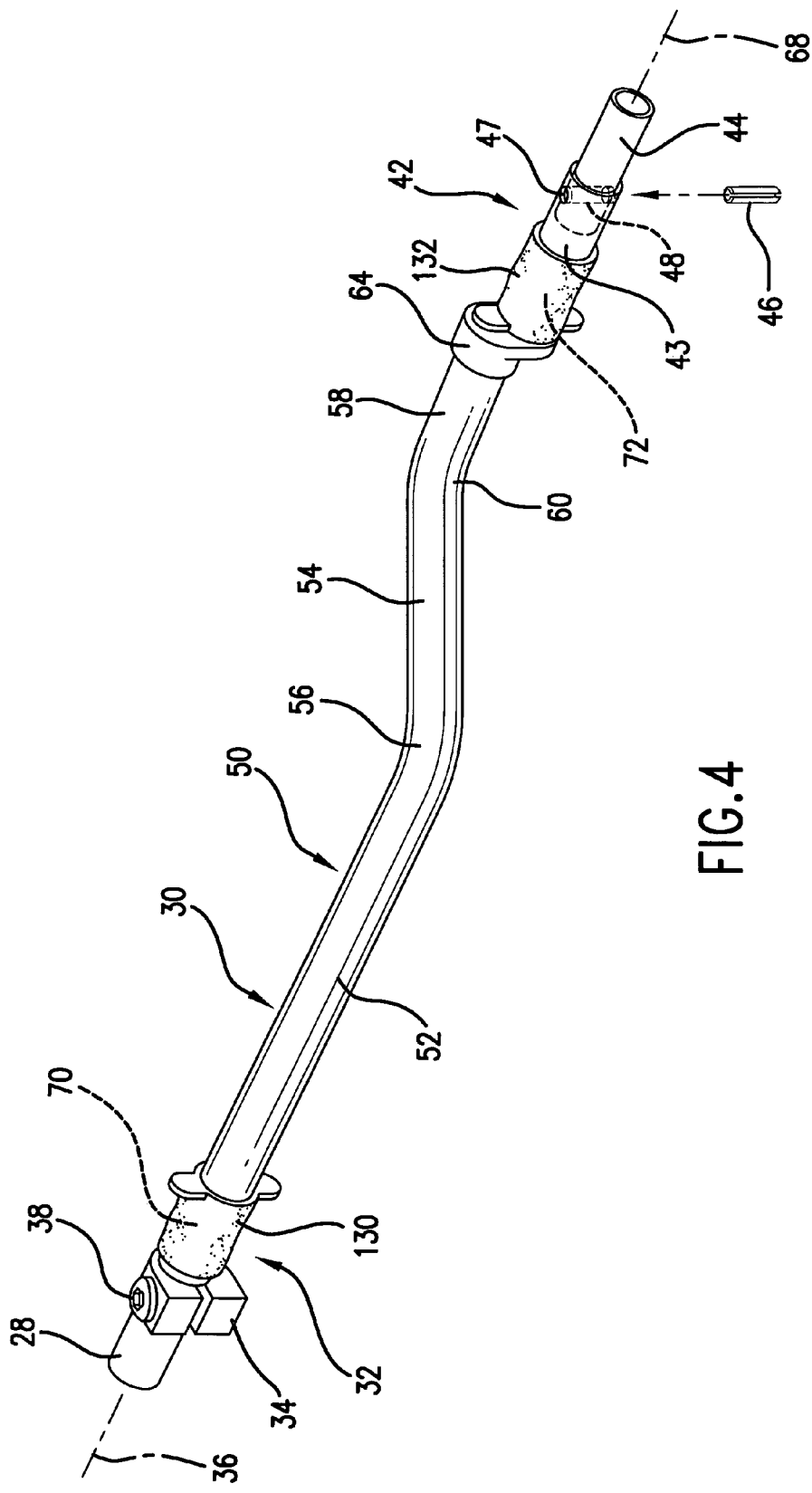
FIG. 4 is a perspective view of the shifter rod assembly of FIG. 3 shown in isolation.

Referring now to FIG. 4 in combination with FIG. 3, the shifter rod assembly 30 has a first end 32 that is connected by a clamp 34 onto the actuator shaft 28, which is shifted both axially with respect to a first axis 36 and rotated with respect to the first axis by the manually operated lever 26 of FIGS. 1-3. In order to fix the shifter rod assembly 30 to the actuator shaft 28, the clamp 34 is retained by a bolt 38 that is received through aligned slots disposed proximate the first end 32 of the shifter rod assembly 30 and the free end of the actuator shaft 28.

A second end 42 of the shifter rod assembly 30 includes an end sleeve 43 that is connected to a gear operating shaft 44 extending into the transmission 18 in order to select gear ratios in the transmission with which to drive the road wheels of the vehicle 10. The gear operating shaft 44 is retained on the end sleeve 43 of the shifter rod assembly 30 by a roll pin 46 which passes through aligned holes 47 and 48 in the end sleeve and operating shaft, respectively, so that the operating shaft is fixed axially and rotationally to the second end 42 of the shifter rod assembly.

The shifter rod assembly 30 includes a tubular shifter rod 50 made of steel and having three portions. The tubular shifter rod 50 has a first portion 52 that extends parallel to the torque tube 14 along an upper side surface thereof; a second portion 54 rigidly connected to the first portion 52 by a bend 56, and a third portion 58 rigidly joined by a bend 60 to the second portion 54. The second portion 54 extends obliquely up and over the top of the torque tube 14 (FIG. 3) while the third portion 58 extends along the top of the torque tube in a direction parallel to the axis of the torque tube. The second end 42 of the shifter rod assembly 30 is mounted to the third section 58 of the shifter rod 50 through a crank 64 disposed at the end of the third section. The crank 64 offsets the third section 58 of the shifter rod 50 with respect to a second axis 68 that is the axis of the second end 42 of the shifter rod assembly 30.

Referring now to FIG. 5 there is shown a first universal joint 70 and a second universal joint 72, both preferably machined of steel at relatively large tolerances. The first universal joint 70 is disposed between the first section 52 of the tubular shifter rod 50 and a sleeve 74 which receives therein the actuator shaft 28 (see FIGS. 1 and 2) from the manual shift assembly 20. The sleeve 74 has a slot 76 formed therein which is complemented by a similar slot in the actuator shaft 28 so that the bolt 38 which passes through the clamp 34 of FIGS. 1 and 2 fixes the collar 74 with respect to the actuator shaft, wherein the collar 74 rotates with and axially shifts with the actuator shaft.

The sleeve 74 is either unitary or fixed integrally with respect to a first yoke portion 80 of the first universal joint 70. The first universal joint 70 has a first pin 84 which extends through the legs of the first yoke portion 80 and through an internal block 86. The internal block 86 is connected by a second pin 88 to a second yoke 90 that has a pair of legs disposed in the gap between the legs of the first yoke 80, which are in turn retained in a gap between the legs of the first yoke by the second pin 88. The second yoke 90 is welded or otherwise fixed to the first portion 52 of the tubular shifter rod 50.

The crank arm 64 on the third portion 58 of the shifter rod 50 has the end sleeve 43 of the shifter rod assembly 30 attached thereto by the second universal joint 72. The second universal joint 72 has a first yoke portion 102 which is unitary or fixed integrally with the end sleeve 43 that receives the gear operating shaft 44 connected to the transmission 18. The first yoke 102 is connected to an internal block 104 by a pin 106. A pin 108 also extends through the block 104 and connects the legs of a second yoke portion 110 to the internal block 104. The yoke portion 110 is welded to the crank arm 64 that is fixed in the end of the third portion 58 of shifter rod 50.

The shifter rod assembly 30, which is comprised of all the components between the first and second ends 32 and 42 thereof, is preferably provided with universal joints 70 and 72 that are low-precision universal joints having relatively large tolerances in order to minimize the expense of fabricating the shifter rod assembly. Since the transmission 18 is only intermittently operated, and since there is relatively small rotational and axial motion transmitted by the shifter rod assembly 30 from the manual shift lever 26 to the transmission 18, there is no mechanical need to precision machine the components of the universal joints 70 and 72. Precision machining the universal joints 70 and 72 adds considerable expense to the shifter rod assembly 30 without increasing reliability or smooth operational feel. Since the universal joints 70 and 72 are subject to engine, drive train and road vibration, low precision universal joints 70 and 72, configured as in FIG. 3 with large tolerances, tend to rattle.

As is seen in FIG. 6, in order to preclude rattling, the large tolerance universal joints 70 and 72 are encased in elastomer layers 120 and 122, respectively. In a preferred embodiment, the material of the elastomer layers 120 and 122 cures at room temperature. Materials such as, but not limited to, silicone elastomers (for example, room temperature vinyl silicone elastomer) provide suitable materials for encasing the universal joints 70 and 72. Preferably, the elastomer layers 120 and 122 fill voids in the universal joints 70 and 72, such as the voids between the block 86 and the yokes 80 and 90 of the universal joint 70 and the voids between the block 104 and the yokes 110 and 102 of the universal joint 72. As is seen in FIG. 6, the elastomer layers 120 and 122 also extend over the outer surfaces of the yokes 80 and 90 and 102 and 110 and over the exposed ends of the pins 84 and 88 and the pins 104,106, as well as any other exposed surfaces of the universal joints. While it is preferable that complete filling of voids and coating of surfaces occur, it is sufficient that encasement of the universal joints 70 and 72 is complete enough to substantially minimize rattle or the risk of rattle in the universal joints. Silicone elastomer is a preferable material because it will retain its integrity at sustained temperatures of about 200° F. with periodic increases to about 240° F.

Referring now to FIG. 7, optional first and second rubber boots 130 and 132 are positioned over the elastomer layers 120 and 122, respectively. However, if the elastomeric layers 120 and 122 completely encase the universal joints 70 and 72 and themselves keep out dust, then in accordance with one embodiment of the invention, the boots may be dispensed with.

According to another embodiment of the invention, after the boots 130 and 132 have been slipped over the universal joints 70 and 72, a technique for reducing rattle in the universal joints 70 and 72 is to inject liquid elastomer between the universal joints and the boots. If the liquid elastomer is a silicone elastomer, it coats the universal joints 70 and 72 and cures at room temperature.

Instead of utilizing the first and second boots 130 and 132 as molds to retain and form injected liquid elastomer, other processes may be employed such as dipping the universal joints 70 and 72 in liquid elastomer and then allowing the silicone to cure. In another process the universal joints 70 and 72 are surrounded by molds (not shown) into which elastomer is injected in liquid form. The molds are removed after the elastomer has solidified and has cured or is curing.

Other approaches comprise applying sleeves of heat shrinkable polymers over the universal joints 70 and 72 and then applying heat to constrict the sleeves against surfaces of the universal joints.

Other materials suggested for the elastomer layers 120 and 122 are TEFLON®, neoprene, butyl rubber, styrene-butadine rubber, acrylonitrite-styrene based rubber and polyvinyl chloride; however, silicone elastomer is preferable because of its liquid application, room temperature cure and high temperature resistance.

From the foregoing description, one skilled in the art can easily ascertain the essential characteristics of this invention, and without departing form the spirit and scope thereof, can make various changes and modifications of the invention to adapt it to various usages and conditions.

We claim:

1. A shifter rod assembly for connecting a manual gear shifter assembly to a transmission of a motor vehicle, wherein the shifter rod assembly transmits both axial and rotational motion from the manual gear shift assembly to the transmission, the shifter rod assembly comprising:

a shifter rod having a first end and a second end, the first end being connected to the gear shift assembly through a first universal joint and the second end being connected to the transmission through a second universal joint; and a first layer of elastomer material encasing the first universal joint and a second layer of elastomer material encasing the second universal joint, wherein the encasing provides substantial filling of voids and coating of surfaces of the first and second universal joints.

2. The shifter rod assembly of claim 1 wherein the shifter rod is a hollow tube.

3. The shifter rod assembly of claim 2 wherein the first and second universal joints respectively comprise components having a tolerance with play that in the absence of the layers of elastomer material thereover permit rattle in the joints during vehicle operation.

4. The shifter rod assembly of claim 3 wherein the shifter rod comprises a first straight section extending from first universal joint connected to the gear shifter assembly toward the transmission;

a second section; and a third section, the third section extending substantially parallel to the first section and being connected to the second universal joint by a crank arm;

wherein the second section extends obliquely from the first section to the third section.

5. The shifter rod assembly of claim 4 wherein the shifter rod assembly further includes a first boot disposed around the first layer of elastomer material encasing the first universal joint and a second boot disposed around the second layer of elastomer material encasing the second universal joint.

6. The shifter rod assembly of claim 5 wherein the boots are made of rubber.

7. The shifter rod assembly of claim 6 wherein the elastomer material is a silicone elastomer which cures at room temperature.

8. The shifter rod assembly of claim 6 wherein the motor vehicle has a torque tube having an axis; wherein the shifter rod is constructed and arranged to have the first section extending from the gear shifter assembly along a side area of the torque tube in a direction substantially parallel to the axis of the torque tube; to have the second section extending obliquely with respect to the axis of the torque tube; and to have the third section extend substantially parallel to the axis of the torque tube along an upper surface of the torque tube.

9. The shifter rod assembly of claim 1 wherein the elastomer material is a silicone elastomer which cures at room temperature.

10. The shifter rod assembly of claim 1 wherein the shifter rod is made of tubular steel.

11. A shifter rod assembly for connecting a manual gear shifter assembly including an operating lever to a transmission of a motor vehicle, wherein the shifter rod assembly transmits both axial and rotational motion from the manual gear shift assembly to the transmission, the shifter rod assembly comprising:

a shifter rod of tubular steel having a first end and a second end, the first end being connected to the gear shift assembly through a first universal joint and the second end being connected to the transmission through a second universal joint, wherein said first and second universal joints respectively comprise components having a tolerance with play that permits rattle respectively therebetween; and a first layer of elastomer material encasing the first universal joint and a second layer of elastomer material encasing the second universal joint, wherein the encasing provides sufficient filling of voids and coating of surfaces of the first and second universal joints to minimize the rattle.

12. The shifter rod assembly of claim 1 further including first and second boots surrounding the first and second layers of elastomer material.

13. The shifter rod assembly of claim 11 wherein the elastomer material is a silicone elastomer which cures from a liquid to a solid form at room temperatures and is resistant to temperatures in the range of 200° F. to 240° F.

* * * * *